United States Patent [19]

Kishimoto et al.

[11] Patent Number: 5,350,793
[45] Date of Patent: Sep. 27, 1994

[54] DAMPING MATERIAL

[75] Inventors: Atsunori Kishimoto, Higashihiroshima; Takashi Fujii, deceased, late of Hiroshima, by Naoko Fujii, legal representative; Kazutaka Ohshita, Hiroshima; Kazumi Yamamoto, Higashihiroshima; Yasuhiko Fujii, Ohtake; Tetsuro Toda, Hiroshima, all of Japan

[73] Assignees: Toda Kogyo Corporation; Hirotani Co., Ltd., Hiroshima, Japan

[21] Appl. No.: 975,325

[22] Filed: Nov. 16, 1992

[30] Foreign Application Priority Data

Nov. 29, 1991 [JP] Japan .................................. 3-342431
Nov. 29, 1991 [JP] Japan .................................. 3-342432

[51] Int. Cl.$^5$ .......................... C08J 5/10; C08K 3/34; C08L 31/04
[52] U.S. Cl. ................... 524/449; 524/425; 524/431; 524/445; 524/495
[58] Field of Search ............... 524/425, 431, 445, 449, 524/495

[56] References Cited

U.S. PATENT DOCUMENTS 4,838,939 6/1989 Kanda et al. .............. 106/281.1

FOREIGN PATENT DOCUMENTS 0383580 8/1990 European Pat. Off. .
4-41542 2/1992 Japan .
1087352 10/1967 United Kingdom .
1269661 12/1969 United Kingdom .

*Primary Examiner*—Paul R. Michl
*Assistant Examiner*—U. K. Rajguru
*Attorney, Agent, or Firm*—Nixon & Vanderhye

[57] ABSTRACT

Disclosed herein is a damping material comprising:
(a) a binder composed of 100 parts by weight of an ethylene-vinyl acetate copolymer containing 30 to 65 wt % of vinyl acetate, and 160 to 330 parts by weight of a petroleum resin containing an aromatic petroleum resin as the main ingredient; and
(b) 30 to 180 parts by weight of a filler composed of a scaly powder.

12 Claims, No Drawings

DAMPING MATERIAL

BACKGROUND OF THE INVENTION

The present invention relates to a damping material which has a high damping effect, especially, which has a wide operating temperature range and which has excellent adhesion strength and adhesive followability. The damping material of the present invention is mainly used for vehicles, vessels, electric and machine appliances, and building materials.

As is well known, damping materials are used in various fields in order to prevent and suppress the vibration and the noise which are caused due to the rotation of an engine, a motor or the like which is incorporated into vehicles such as automobiles and electric cars, vessels, and electric and machine appliances such as washing machines, drying machines, acoustic apparatuses, precision machine tools, and factory and plant machines and tools; to prevent and suppress the vibration and the noise generated in the water or gas conduits or air-conditioning ducts in office buildings and houses; and to prevent the vibration caused by vehicles running on the road or railroad tracks.

With the recent tendency of lightening and/or miniaturizing the vehicles, vessels, electric and machine appliances and building materials, the damping materials used therefor have also been required to be lightened, thinned and miniaturized. For this purpose, a damping material is strongly required to have a high damping effect (for example, the peak value of the loss factor $\eta$ is not less than 0.30).

In addition, since damping materials are often used under the circumstance of the wide temperature range, it is further desirable that a high damping effect can be maintained in as wide a temperature range as possible, in other words, that an operating temperature range is wide (for example, the width of the operating temperature range of the loss factor $\eta$ of not less than 0.3 is at least 20° C.).

A damping material is also required both to fully display a high damping effect when mounted on a base material and to have an excellent operability such as easiness to handle and mount on the base material. For this purpose, a damping material is strongly required to have an excellent adhesion with the base material, in other words, to have an excellent adhesive strength (e.g., not less than 30 kg/cm²), and to closely and conformingly adhere to the base material, in other words, to have an excellent adhesive followability (e.g., not more than 2 mm) which enables the damping material to sufficiently closely-conformingly adhere to the base material while adapting it to the rough surface or the complicated shape of the base material.

A damping material is generally produced by molding a filler such as mica powder and a binder into a sheet form or block form by extrusion-molding, calendering, compression-molding, injection-molding, cast-molding or the like. A damping material is most frequently used in the sheet form together with a base material such as a steel plate to which the damping material is attached by fusion-bonding or adhesion. As a method of enhancing the damping effect of a damping material, a method of thickening the damping material and a method of adding a large amount of filler having a high density so as to increase the weight of the damping material are well known. By these methods, however, it is difficult to lighten, thin and miniaturize a damping material as described above. As a countermeasure, investigations of methods of enhancing the damping effect by adjusting the composition and the mixing ratio by varying the kinds of the filler and the binder, and the mixing ratio thereof have recently been carried out. For example, the applicant of the present invention has proposed the following vehicle damping sheet in Japanese Patent Application Laid-Open (KOKAI) No. 2-302455 (1990) (corresponding to European Patent No. 0383580A).

"A vehicle damping sheet comprising a blend-mixture comprising: (1) a filler composed of mica, iron oxide particles and an auxiliary filler; and (2) a binder composed of an ethylene-vinyl acetate copolymer, each of the amounts of the mica, the iron oxide particles and the auxiliary filler being 5 to 200 parts by weight per 100 parts by weight of the binder; the total amount of the mica, the iron oxide particles and the auxiliary filler being not less than 30 parts by weight per 100 parts by weight of the binder; and the content of the iron oxide particles in said blend-mixture being from 2 to 40% by weight."

Further, Japanese KOKAI 2-302455 discloses that as the auxiliary filler, calcium carbonate, clay, talc, barium sulfate, asbestos, silica balloon, fibrous material such as waste paper, chemical fiber and wood fiber, etc. may be exemplified and they are used alone or as a mixture thereof, and in particular, the fibrous material such as waste paper, chemical fiber or wood fiber can reduce the flow property of the damping sheet when it is thermally fused to the floor panel of an automobile, thereby preventing disconnection or sagging.

Also, Japanese KOKAI 2-302455 discloses Example 6 that to a binder of 40 parts by weight of ethylene-vinyl acetate copolymer and 60 parts by weight of petroleum resin, a filler of 20 parts by weight of $Fe_3O_4$ particles (size: 0.3 μm) as the iron oxide particles, 90 parts by weight of mica (size: 150 μm), 25 parts by weight of calcium carbonate, 10 parts by weight of waste paper and 10 parts by weight of a process oil was added and blended, and after mixing under heating the blend in a dispersion mixer at a temperature of 120° to 140° C. for 10 min., the thus obtained blend-mixture was rolled spread by a calender rolls to prepare a vehicle damping sheet of 2 mm in thickness.

The applicant of the present invention has also proposed the following damping materials in International Application No. PCT/JP92/00534.

"A self-fusion type damping material comprising: hard ferrite particles as a filler; and a binder, the binder being composed of an ethylene-vinyl acetate copolymer and a petroleum resin which are mixed with the filler so that the amount of the filler is 150 to 600 parts by weight based on 100 parts by weight of the total amount of the ethylene-vinyl acetate copolymer and petroleum resin." and "A self-fusion type damping material comprising: as a filler hard ferrite particles which are mixed with an auxiliary filler selected from scaly powder such as mica and plate-like iron oxide particles, a ballooning agent such as glass and silica, calcium carbonate, clay, barium sulfate and zinc oxide; and a binder, The binder being an ethylene-vinyl acetate copolymer and a petroleum resin which are mixed with the filler so that the amount of the hard ferrite particles is 50 to 400 parts by weight based on 100 parts by weight of the total amount of the ethylene-vinyl acetate copolymer and petroleum resin and the amount of the auxiliary filler is 1 to 200 parts by weight based on 100 parts by weight of the total amount of the ethylene-vinyl acetate copolymer and petroleum resin, and that the total amount of the filler and the auxiliary filler is 100 to 600 parts by weight based on 100 parts by weight of the total amount of the binder."

Although a damping material having a high damping effect, and excellent adhesion strength and adhesive followability is now in the strongest demand, the damping sheet disclosed in Japanese Patent Application Laid-Open (KOKAI) No. 2-302455 (1990) cannot be said to have either a sufficiently high damping effect or a wide operating temperature range because the width of the temperature range thereof in which the loss factor $\eta$ is not less than 0.3 is at most 18° C. In addition, the adhesive strength and the adhesive followability of the damping material disclosed in Japanese KOKAI 2-302455 are about 28 kg/cm$^2$ and about 2 to 3 mm, respectively, which cannot be said to be satisfactory.

As a result of studies undertaken by the present inventors so as to solve the above-described technical problems, it has been found that by mixing and blending 30 to 180 parts by weight of a filler composed of scaly powder with 100 parts by weight of a binder composed of an ethylene-vinyl acetate copolymer containing 30 to 65 wt % of vinyl acetate and a petroleum resin mainly containing an aromatic petroleum resin, wherein the amount of petroleum resin is 160 to 330 parts by weight based on 100 parts by weight of the ethylene-vinyl acetate copolymer, the produced damping material has a high damping effect and excellent adhesion strength and adhesive followability. On the basis of this finding, the present invention has been achieved.

SUMMARY OF THE INVENTION

It is an object of the present invention to provide a damping material having a high adhesive strength of not less than 35 kg/cm$^2$ and an excellent adhesive followability of not more than 2 mm as well as having a high damping effect of a peak loss factor $\eta$ of not less than 0.40 and a wide operating temperature range in which the width of the operating temperature range of not less than 0.3 of the loss factor $\eta$ is at least 20° C.

In a first aspect of the present invention, there is provided a damping material comprising:
(a) 100 parts by weight of a binder composed of an ethylene-vinyl acetate copolymer containing 30 to 65 wt % of vinyl acetate and 160 to 330 parts by weight of a petroleum resin containing an aromatic petroleum resin as the main ingredient based on 100 parts by weight of the ethylene-vinyl acetate copolymer; and
(b) 30 to 180 parts by weight of a filler composed of scaly powder.

In a second aspect of the present invention, there is provided a damping material comprising:
(a) 100 parts by weight of a binder composed of an ethylene-vinyl acetate copolymer containing 30 to 65 wt % of vinyl acetate and 160 to 330 parts by weight of a petroleum resin containing an aromatic petroleum resin as the main ingredient based on 100 parts by weight of the ethylene-vinyl acetate copolymer; and
(b) 31 to 180 parts by weight of a filler composed of 30 to 180 parts by weight of scaly powder based on 100 parts by weight of the binder and not less than 1 part by weight and less than 50 parts by weight of granular powder and/or fibrous material based on 100 parts by weight of the binder.

DETAILED DESCRIPTION OF THE INVENTION

As the ethylene-vinyl acetate copolymer in the present invention, an ethylene-vinyl acetate copolymer containing 30 to 65 wt % of vinyl acetate is usable. If the vinyl acetate content is less than 30 wt % or more than 65 wt %, it is difficult to obtain the target damping material which has a high damping effect, especially, which has a wide operating temperature range and which has excellent adhesive strength and adhesive followability. Under the consideration of the damping effect, the adhesive strength and the adhesive followability, the vinyl acetate content is preferably 32 to 65 wt %, more preferably 35 to 63 wt %.

As the petroleum resin in the present invention, a petroleum resin containing an aromatic petroleum resin as the main ingredient is usable. It is preferable that at least 65 wt %, preferably at least 80 wt % of an aromatic petroleum resin is contained, and aliphatic petroleum resin components such as isoprene and piperylene may be contained as the balance. If the aromatic petroleum resin content is less than 65 wt %, it is difficult to attain a sufficient damping effect, and the adhesive strength is apt to be lowered.

The petroleum resin containing an aromatic petroleum resin as the main ingredient is a resin obtained by, for example, polymerizing at least one petroleum fraction which is obtained by thermal-decomposition of petroleum and which has a boiling point of 140° to 220° C., namely, at least one selected from the group consisting of styrene, vinyl toluene, indene, divinyl benzene and vinyl naphthalene. Under the consideration of the damping effect, the petroleum resin preferably has a softening point of 80° to 170° C., more preferably 90° to 130° C. The aromatic petroleum resin containing not more than 55 wt %, more preferably 65 wt % of a C$_9$ component such as styrene and indene is preferred. The amount of petroleum resin containing an aromatic petroleum resin as the main ingredient is 160 to 330 parts by weight based on 100 parts by weight of the ethylene-vinyl acetate copolymer containing 30 to 65 wt % of vinyl acetate. If the petroleum resin content is less than 160 parts by weight, it is difficult to attain a sufficient damping effect, and the adhesive strength is apt to be lowered. If the petroleum resin content exceeds 330 parts by weight, it is difficult to obtain the target damping material resin which has a high damping effect, and excellent adhesive strength and adhesive followability. Under the consideration of the damping effect, the adhesive strength and the adhesive followability, the petroleum resin content is preferably 160 to 300 parts by weight, more preferably 160 to 240 parts by weight.

As the scaly powder in the present invention, mica, plate-like iron oxide particles, graphite, etc. are usable. The average plate diameter of such powder used is 1 to 2,000 $\mu$m, preferably 1 to 1,000 $\mu$m, more preferably 1 to 350 $\mu$m, and the average plate thickness is 0.01 to 100 $\mu$m, preferably 0.02 to 20 $\mu$m. The amount of scaly powder is 30 to 180 parts by weight based on 100 parts by weight of the binder. If the scaly powder content is less than 30 parts by weight, it is difficult to attain a high damping effect. If it exceeds 180 parts by weight, it is difficult to attain a sufficient damping effect, and both the adhesive strength and the adhesive followability are apt to be lowered. Under the consideration of the damping effect, the adhesive strength and the adhesive followability, the scaly powder content is preferably 70 to 150 parts by weight.

It is preferable to use granular powder and/or fibrous material in addition to the scaly powder as the filler of the damping material of the present invention because the width of the operating temperature range is enlarged thereby.

The amount of scaly powder when granular powder and/or fibrous material used in addition thereto is 30 to 150 parts by weight, preferably 50 to 150 parts by weight, more preferably 50 to 140 parts by weight based on 100 parts by weight of the binder.

As the granular powder in the present invention, particles having an average particle diameter of 0.05 to 100 μm, preferably 0.05 to 30 μm are usable. More specifically, iron oxides particles such as hematite particles, magnetite particles, maghemite particles, strontium ferrite particles and barium ferrite particles, quarts sand, talc, clay, lead powder, iron powder, titanium oxide, zinc white, barium sulfate, calcium carbonate, etc. are usable.

As the fibrous material in the present invention, particles having an average major axial diameter of 0.1 to 50,000 μm, preferably 0.4 to 20,000 μm, an average minor axial diameter of 0.02 to 250 μm, preferably 0.05 to 100 μm and an aspect ratio (average major axial diameter/average minor axial diameter) of not less than 3, preferably not less than 5 are usable. As the fibrous material, fibers, acicular materials, spindle-shaped materials are usable. More specifically, as the fibrous material, iron oxides such as magnetite and maghemite, calcium carbonate, synthetic fibers, asbestos, natural organic fibers, glass fibers, carbon fibers, etc. are usable.

The amount of granular powder and/or fibrous material is less than 50 parts by weight, preferably not less than 1 part by weight and less than 50 parts by weight, more preferably 1 to 40 parts by weight based on 100 parts by weight of the binder. If the amount of granular powder and/or fibrous material is not less than 50 parts by weight, the operating temperature range is apt to become narrow. From the point of view of a wide operating temperature range which is one of the objects of the present invention, the amount of granular powder and/or fibrous material is desirably less than 50 parts by weight.

In the present invention, the total amount of scaly powder and granular powder and/or fibrous material is 31 to 180 parts by weight based on 100 parts by weight of the binder. If the total amount is less than 31 parts by weight, it is difficult to attain a sufficient damping effect. If it exceeds 180 parts by weight, it is also difficult to attain a sufficient damping effect, and in addition, the adhesive strength and the adhesive followability are also lowered. From the point of view of the damping effect, the operating temperature range, the adhesive strength and the adhesive followability, the total amount is preferably 70 to 150 parts by weight.

In the present invention, it is possible to add at least one plasticizer which is generally used, such as process oil, DOP, stearic acid, Zn stearate, Mg stearate and Ca stearate in order to enhance the properties of the damping material.

The effect intended in the present invention cannot be attained in any of: the case in which the vinyl acetate content in the ethylene-vinyl acetate copolymer is out of the specified range; the case in which the amount of ethylene-vinyl acetate copolymer containing vinyl acetate within the specified range is out of the specified range; the case in which a petroleum resin which does not contain an aromatic petroleum resin is used; the case in which the amount of petroleum resin containing an aromatic petroleum resin as the main ingredient is out of the specified range; the case in which only granular powder and/or fibrous material is used as the filler; the case in which the amount of scaly powder is out of the specified range; and further, the case in which the total amount of scaly powder and granular powder and/or fibrous material is out of the specified range, as shown in later-described comparative examples. The present inventors, therefore, consider that it is due to the synergistic effect of the specified ethylene-vinyl acetate copolymer and the specified amount thereof, the specified petroleum resin and the specified amount thereof, and the filler having the specified shape and the specified amount thereof that a damping material produced according to the present invention has a high damping effect and excellent adhesive strength and adhesive followability.

In the damping material of the present invention, the peak value of the loss factor $\eta$ is not less than 0.40, preferably not less than 0.41, the adhesive strength is not less than 35 kg/cm$^2$, preferably not less than 40 kg/cm$^2$, and the adhesive followability is less than 2 mm. Especially, when granular powder and/or fibrous material is used in addition to scaly powder, the width of the operating temperature range in which the loss factor $\eta$ is not less than 0.3, is 20 to 32° C.

The damping material of the present invention has a high damping effect and excellent adhesive strength and adhesive followability, as shown in the later-described examples. It is therefore possible to lighten, thin and miniaturize the damping material while maintaining the high damping effect. Thus, since the damping material has good workability and operability, it is suitable for use in vehicles, vessels, electric and machine appliances and building materials.

The damping material of the present invention having the above-described advantages is especially suitable as a material for vehicles such as automobiles in which the variation of the surrounding temperature is large, large vibration is constantly caused, and the base material on which the damping material is mounted has a complicated shape and a rough surface.

EXAMPLES

The present invention will be explained in more detail hereinunder with reference to the following examples, but it is to be understood that the present invention is not restricted to these examples.

The loss factor $\eta$, the adhesive strength and the adhesive followability were measured as follows:
Loss factor $\eta$ The loss factor $\eta$ was measured by a cantilever resonance method using a damping property measurement system composed of Complex Modulus Apparatus (ME-3930, manufactured by Brüel & Kjaer Corporation), Dual Channel Signal Analyzer (Model-2034, manufactured by Brüel & Kjaer Corporation) and a personal computer (HP-300, manufactured by Hewlett Packard Corporation).
Adhesive strength Two steel plates (30 mm in length, 30 mm in width and 5 mm in thickness) were prepared and a shaft 10 mm in diameter was welded to the central portion of one side of each plate. A damping sheet (30 mm in length, 30 mm in width and 2 mm in thickness) was sandwiched between the two steel plates with the shafts faced outward. After the thus-obtained test piece was heated at 150° C. for 30 minutes in a drying machine, it was taken out into air and cooled to ordinary temperature. The adhesive strength of the damping sheet was expressed by the tensile strength measured by an universal testing machine AUTOGRAPH AGS-500A (manufactured by Shimazu Co., Ltd). That is, the shafts of the testing piece were pulled at a rate of 50 mm/min, and the load at the time when the damping sheet was broken was measured. The adhesive strength was expressed by the value obtained by dividing the load (kg) by the area (9 cm$^2$) of the damping sheet.

Adhesive followability

Unevenness was formed on the surface of a steel plate of 0.8 mm in thickness and 300 mm in width as a base plate. The shape of each concavity in the front view was approximately a trapezoid having a longer upper side. In the front view, the height of the trapezoid was 20 mm, the length of the upside in the trapezoid was 80 mm, and the angle of inclination between the base and lateral in the trapezoid at the contact point of both sides was 140°. The inner curvature radius of the base surface in the concavity was 3 mm. A damping sheet (2 mm in thickness, 150 mm in width and 200 mm in length) was placed on the thus-produced base plate, and the test piece was heated at 150° C. for 30 minutes in a drying machine. Thereafter, the test piece was taken out into air and cooled to ordinary temperature. The adhesive followability of the damping sheet was expressed by the distance between the steel plate and the damping sheet at the curved portion of the bottom portion of the steel plate.

Example 1

140 parts by weight of mica (average plate diameter: 150 μm, average thickness: 1.9 μm) was added to the binder composed of 30 parts by weight of an ethylene-vinyl acetate copolymer containing 60 wt % of vinyl acetate (VA =60 wt %) and 70 +parts by weight of a petroleum resin composed of 100 wt % of an aromatic petroleum resin (softening point: 103° C., main ingredients: 10 wt % of styrene, 20 wt % of vinyl toluene and 33 wt % of indene). The mixture was kneaded under heating for 10 minutes by an intensive mixer. The kneaded mixture was then rolled by calender rolls, thereby obtaining a damping sheet of 2 mm in thickness. The damping sheet obtained was cut into a sheet of 15 mm in width and 220 mm in length and set on a steel plate substrate(15 mm in width, 300 mm in length and 0.8 mm in thickness). The thus-obtained test piece was heated at 150° C. for 30 minutes so as to fusion-bond the sheet to the base plate. The loss factors η were measured at various temperatures by a cantilever resonance method. The peak value of the loss factor η was 0.50 at a temperature of 40° C., which shows the damping sheet had an excellent damping effect. The adhesive strength was 40 kg/cm$^2$, and the adhesive followability was 1 to 2 mm, both being excellent.

Examples 2 to 4, Comparative Examples 1 to 9

Damping sheets were produced and the test pieces for evaluating the damping effect were obtained in the same way as in Example 1 except that the compositions were varied as shown in Table 1. The peak value of the loss factor η, the temperature at that time, the adhesive strength and the adhesive followability of each test piece are shown in Table 1.

The petroleum resin containing 90 wt % of an aromatic petroleum resin in Example 2 had a softening point of 94° C. and contained 15 wt % of styrene, 31 wt % of vinyl toluene and 16 wt % of indene as the main ingredients. The petroleum resin containing 10 wt % of an aromatic petroleum resin in Comparative Example 3 had a softening point of 80° C. and contained 10 wt % of an aromatic petroleum resin mainly composed of styrene, vinyl toluene and indene and 90 wt % of an aliphatic petroleum resin mainly composed of isoprene and piperylene. The petroleum resin containing 60 wt % of an aromatic petroleum resin in Comparative Example 9 had a softening point of 101° C. and contained 60 wt % of an aromatic petroleum resin mainly composed of styrene, vinyl toluene and indene and 40 wt % of an aliphatic petroleum resin mainly composed of isoprene and piperylene.

Example 5

130 parts by weight of mica (average plate diameter: 150 μm, average thickness: 1.9 μm) and 25 parts by weight of granular magnetite powder were added to the binder composed of 30 parts by weight of an ethylene-vinyl acetate copolymer containing 60 wt % of vinyl acetate (VA =60 wt %) and 70 parts by weight of a petroleum resin composed of 100 wt % of an aromatic petroleum resin (softening point: 103° C., main ingredients: 10 wt % of styrene, 20 wt % of vinyl toluene and 33 wt % of indene). The mixture was kneaded under heating for 10 minutes by an intensive mixer. The kneaded mixture was then rolled by calender rolls, thereby obtaining a damping sheet of 2 mm in thickness. The damping sheet obtained was cut into a sheet of 15 mm in width and 220 mm in length and set on a steel plate substrate(15 mm in width, 300 mm in length and 0.8 mm in thickness). The thus-obtained test piece was heated at 150° C. for 30 minutes so as to fusion-bond the sheet to the base plate. The loss factors η were measured at various temperatures by a cantilever resonance method. The loss factors η at various temperatures are shown in Table 3. A loss factor η of not less than 0.3 (which shows a high damping effect) was maintained in such a wide temperature range as 26° to 56° C. (a width of the temperature range is 30° C.). That is, the damping sheet had a wide operating temperature range. The adhesive strength was 41 kg/cm$^2$, and the adhesive followability was 1 to 2 mm, both being excellent.

Examples 6 to 11, Comparative Examples 10 to 17

Damping sheets were produced and the test pieces for evaluating the damping effect were obtained in the same way as in Example 5 except that the compositions were varied as shown in Table 2. The loss factors η at various temperatures, the temperature range when the loss factors η was at not less than 0.3, the adhesive strength and the adhesive followability of each test piece are shown in Table 3.

The petroleum resin containing 90 wt % of an aromatic petroleum resin in Example 6 had a softening point of 94° C. and contained 15 wt % of styrene, 31 wt % of vinyl toluene and 16 wt % of indene as the main ingredients. The petroleum resin containing 10 wt % of an aromatic petroleum resin in Comparative Example 12 had a softening point of 80° C. and contained 10 wt % of an aromatic petroleum resin mainly composed of styrene, vinyl toluene and indene and 90 wt % of an aliphatic petroleum resin mainly composed of isoprene and piperylene. The petroleum resin containing 60 wt % of an aromatic petroleum resin in Comparative Example 17 had a softening point of 101° C. and contained 60 wt % of an aromatic petroleum resin mainly composed of styrene, vinyl toluene and indene and 40 wt % of an aliphatic petroleum resin mainly composed of isoprene and piperylene.

TABLE 1

| Examples and Comparative Examples | Composition for Damping Sheet ||||||||
|---|---|---|---|---|---|---|---|---|
| | Binder |||| Fillers ||||
| | Ethylene-vinyl acetate copolymer || Petroleum Resin || Scaly Filler || Granular Filler ||
| | Kind | Amount (parts by weight) | Kind | Amount (parts by weight) | Kind | Amount (parts by weight) | Kind | Amount (parts by weight) |
| Example 1 | VA = 60% | 30 | Petroleum resin composed of 100 wt % of aromatic petroleum resin | 70 | Mica powder (average plate diameter: 150 μm, average thickness: 3 μm) | 140 | — | — |
| Example 2 | VA = 40% | 30 | Petroleum resin containing 90 wt % of aromatic petroleum resin | 70 | Plate-like hematite particles (average plate diameter: 2.5 μm, average thickness: 0.02 μm) | 140 | — | — |
| Example 3 | VA = 40% | 37 | Same resin as in Example 1 | 63 | Same mica powder as in Example 1 | 100 | — | — |
| Example 4 | VA = 60% | 28 | Same resin as in Example 2 | 72 | Same mica powder as in Example 1 | 120 | — | — |
| Comparative Example 1 | VA = 40% | 70 | Same resin as in Example 1 | 30 | Same mica powder as in Example 1 | 100 | — | — |
| Comparative Example 2 | VA = 40% | 20 | Same resin as in Example 1 | 80 | Same mica powder as in Example 1 | 100 | — | — |
| Comparative Example 3 | VA = 40% | 30 | Petroleum resin containing 10 wt % of aromatic petroleum resin | 70 | Same mica powder as in Example 1 | 100 | — | — |
| Comparative Example 4 | VA = 20% | 30 | Same resin as in Example 2 | 70 | Same mica powder as in Example 1 | 100 | — | — |
| Comparative Example 5 | VA = 80% | 30 | Same resin as in Example 1 | 70 | Same mica powder as in Example 1 | 100 | — | — |
| Comparative Example 6 | VA = 40% | 30 | Same resin as in Example 1 | 70 | Same mica powder as in Example 1 | 10 | — | — |
| Comparative Example 7 | VA = 40% | 30 | Same resin as in Example 2 | 70 | Same mica powder as in Example 1 | 300 | — | — |
| Comparative Example 8 | VA = 40% | 30 | Same resin as in Example 1 | 70 | — | — | Magnetite particles | 100 |
| Comparative Example 9 | VA = 28% | 30 | Petroleum resin containing 60 wt % of aromatic petroleum resin | 70 | Same mica powder as in Example 1 | 110 | Magnetite / Calcium carbonate / Waste paper | 40 / 25 / 10 |

| Examples and Comparative Examples | Properties of Damping Sheet ||||
|---|---|---|---|---|
| | Loss factor η || Adhesive Strength (kg/cm²) | Adhesive Followability (mm) |
| | Peak Value (—) | Temp. at the Peak (°C.) | | |
| Example 1 | 0.50 | 40 | 40 | 1–2 |
| Example 2 | 0.45 | 30 | 44 | 1↓ |
| Example 3 | 0.45 | 40 | 42 | 1–2 |
| Example 4 | 0.47 | 30 | 41 | 1–2 |
| Comparative Example 1 | 0.11 | 40 | 22 | 1–2 |
| Comparative Example 2 | 0.14 | 40 | 28 | 3–4 |
| Comparative Example 3 | 0.10 | 20 | 25 | 1–2 |
| Comparative Example 4 | 0.12 | 40 | 20 | 3–4 |
| Comparative Example 5 | 0.17 | 30 | 22 | 3–4 |
| Comparative Example 6 | 0.14 | 40 | 40 | 1↓ |
| Comparative Example 7 | 0.19 | 40 | 19 | 3–4 |
| Comparative Example 8 | 0.15 | 30 | 39 | 1↓ |
| Comparative Example 9 | 0.39 | 40 | 28 | 2–3 |

TABLE 2

| | Composition for Damping Sheet | | | | | | | |
|---|---|---|---|---|---|---|---|---|
| | Binder | | | | Fillers | | | |
| | Ethylene-vinyl acetate copolymer | | Petroleum Resin | | Scaly Filler | | Granular Fillers and/or Fibrous Fillers | |
| Examples and Comparative Examples | Kind | Amount (parts by weight) | Kind | Amount (parts by weight) | Kind | Amount (parts weight) | Kind | Amount (parts by weight) |
| Example 5 | VA = 60% | 30 | Petroleum resin composed of 100 wt % of aromatic petroleum resin | 70 | Mica powder (average plate diameter: 150 μm, average thickness: 1.9 μm) | 130 | Granular magnetite (average particle diameter: 0.3 μm) | 25 |
| Example 6 | VA = 40% | 30 | Petroleum resin containing 90 wt % of aromatic petroleum resin | 70 | Plate-like hematite particles (average plate diameter: 2.5 μm, average thickness: 0.02 μm) | 110 | Spindle-shaped calcium carbonate (average major axial diameter: 5 μm, average minor axial diameter: 0.5 μm) | 40 |
| Example 7 | VA = 40% | 37 | Same resin as in Example 5 | 63 | Same mica powder as in Example 5 | 70 | Acicular maghemite (average major axial diameter: 0.6 μm, average minor axial diameter: 0.1 μm) | 20 |
| Example 8 | VA = 60% | 28 | Same resin as in Example 6 | 72 | Same mica powder as in Example 5 | 100 | Same spindle-shaped calcium carbonate as in Example 6 | 20 |
| Example 9 | VA = 60% | 30 | Same resin as in Example 5 | 70 | Same mica powder as in Example 5 | 130 | Glass fiber (average major axial diameter: 6 μm, average minor axial diameter: 0.5 μm) | 20 |
| Example 10 | VA = 60% | 30 | Same resin as in Example 5 | 70 | Same mica powder as in Example 5 | 130 | Same granular magnetite as in Example 5 | 10 |
| | | | | | | | Same acicular maghemite as in Example 7 | 5 |
| Example 11 | VA = 60% | 30 | Same resin as in Example 6 | 70 | Same mica powder as in Example 5 | 130 | — | — |
| Comp. Example 10 | VA = 40% | 70 | Same resin as in Example 5 | 30 | Same mica powder as in Example 5 | 100 | Same granular magnetite as in Example 5 | 30 |
| Comp. Example 11 | VA = 40% | 20 | Same resin as in Example 5 | 80 | Same mica powder as in Example 5 | 50 | Same acicular maghemite as in Example 7 | 30 |
| Comp. Example 12 | VA = 40% | 30 | Petroleum resin containing 10 wt % of aromatic petroleum resin | 70 | Same mica powder as in Example 5 | 100 | Same granular magnetite as in Example 5 | 30 |
| Comp. Example 13 | VA = 20% | 30 | Same resin as in Example 6 | 70 | Same mica powder as in Example 5 | 100 | Same spindle-shaped calcium carbonate as in Example 6 | 30 |
| Comp. Example 14 | VA = 80% | 30 | Same resin as in Example 5 | 70 | Same plate-like hematite particles as in Example 6 | 100 | Same granular magnetite as in Example 5 | 30 |
| Comp. Example 15 | VA = 40% | 30 | Same resin as in Example 5 | 70 | Same mica powder as in Example 5 | 10 | Same granular magnetite as in Example 7 | 120 |
| Comp. Example 16 | VA = 40% | 30 | Same resin as in Example 6 | 70 | Same mica powder as in Example 5 | 300 | Same granular magnetite as in Example 5 | 20 |
| Comp. Example 17 | VA = 28% | 30 | Petroleum resin containing 60 wt % of aromatic petroleum resin | 70 | Same mica powder as in Example 5 | 110 | Same granular magnetite as in Example 5 | 40 |
| | | | | | | | Same spindle-shaped calcium carbonate as in Example 6 | 25 |
| | | | | | | | Waste paper | 10 |

TABLE 3

| Examples and Comparative Examples | Loss Factor η | | | | | | | | | Temperature range in which η is not less than 0.3 (°C.) | Adhesive Strength (Kg/cm²) | Adhesive Followability (mm) |
|---|---|---|---|---|---|---|---|---|---|---|---|---|
| | 0° C. | 10° C. | 20° C. | 30° C. | 40° C. | 50° C. | 60° C. | 70° C. | 80° C. | | | |
| Example 5 | 0.08 | 0.13 | 0.20 | 0.35 | 0.51 | 0.41 | 0.21 | 0.09 | 0.04 | 26–56 | 41 | 1–2 |
| Example 6 | 0.05 | 0.11 | 0.17 | 0.31 | 0.41 | 0.32 | 0.21 | 0.10 | 0.04 | 29–52 | 44 | 1↓ |
| Example 7 | 0.06 | 0.14 | 0.24 | 0.42 | 0.36 | 0.27 | 0.18 | 0.09 | 0.04 | 23–46 | 42 | 1–2 |
| Example 8 | 0.05 | 0.14 | 0.23 | 0.40 | 0.46 | 0.26 | 0.12 | 0.07 | 0.03 | 24–48 | 41 | 1–2 |
| Example 9 | 0.05 | 0.11 | 0.19 | 0.33 | 0.42 | 0.39 | 0.20 | 0.08 | 0.04 | 25–49 | 39 | 1–2 |
| Example 10 | 0.06 | 0.13 | 0.21 | 0.33 | 0.44 | 0.38 | 0.20 | 0.09 | 0.04 | 27–51 | 40 | 1–2 |
| Example 11 | 0.05 | 0.09 | 0.19 | 0.43 | 0.20 | 0.14 | 0.10 | 0.05 | 0.03 | 24–36 | 37 | 1–2 |
| Comp. Example 10 | 0.03 | 0.04 | 0.07 | 0.11 | 0.11 | 0.09 | 0.08 | 0.06 | 0.03 | — | 35 | 1–2 |
| Comp. Example 11 | 0.02 | 0.05 | 0.06 | 0.11 | 0.10 | 0.09 | 0.07 | 0.04 | 0.02 | — | 35 | 2–3 |
| Comp. Example 12 | 0.03 | 0.05 | 0.08 | 0.11 | 0.13 | 0.10 | 0.08 | 0.05 | 0.03 | — | 32 | 1–2 |
| Comp. Example 13 | 0.04 | 0.05 | 0.10 | 0.14 | 0.16 | 0.13 | 0.09 | 0.05 | 0.03 | — | 28 | 3–4 |
| Comp. Example 14 | 0.06 | 0.08 | 0.11 | 0.15 | 0.13 | 0.11 | 0.05 | 0.03 | 0.02 | — | 34 | 2–3 |
| Comp. Example 15 | 0.04 | 0.07 | 0.10 | 0.13 | 0.17 | 0.15 | 0.11 | 0.07 | 0.04 | — | 45 | 2–3 |
| Comp. Example 16 | 0.02 | 0.04 | 0.06 | 0.11 | 0.18 | 0.15 | 0.13 | 0.09 | 0.07 | — | 25 | 3–4 |
| Comp. Example 17 | 0.05 | 0.08 | 0.12 | 0.23 | 0.39 | 0.33 | 0.24 | 0.08 | 0.03 | 35–53 | 28 | 2–3 |

What is claimes is:

1. a damping material comprising:
   (a) a binder composed of 100 parts by weight of an ethylene-vinyl acetate copolymer containing 30 to 65 wt % of vinyl acetate and 160 to 330 parts by weight of a petroleum resin containing an aromatic petroleum resin as the main ingredient based on 100 parts by weight of an ethylene-vinyl acetate copolymer; and
   (b) 30 to 180 parts by weight of a filler composed of a scaly powder based on 100 parts by weight of said binder.

2. A damping material according to claim 1, wherein said petroleum resin contains not less than 65 wt % of said aromatic petroleum resin.

3. A damping material according to claim 1, wherein the softening point of said petroleum resin is 80° to 170° C.

4. A damping material according to claim 1, wherein said scaly powder is at least one selected from the group consisting of mica, plate-like iron oxide particles and graphite.

5. A damping material according to claim 1, wherein said scaly powder has an average plate diameter of 1 to 2000 μm and an average plate thickness of 0.01 to 100 μm.

6. A damping material according to claim 1, wherein the content of said vinyl acetate is 32 to 65 wt %, the amount of said petroleum resin is 160 to 300 parts by weight based on 100 parts by weight of said ethylene-vinyl acetate copolymer, and the amount of said filler is 70 to 150 parts by weight based on 100 parts by weight of said binder.

7. A damping material according to claim 1, wherein said filler further contains not less than 1 part by weight and less than 50 parts by weight of a granular powder, a fibrous material or a mixture thereof based on 100 parts by weight of said binder.

8. A damping material according to claim 7, which comprises
   (a) a binder composed of 100 parts by weight of ethylene-vinyl acetate copolymer containing 30 to 65 wt % of vinyl acetate, and 160 to 330 parts by weight of the petroleum resin containing an aromatic petroleum resin as the main ingredient based on 100 parts by weight of an ethylene-vinyl acetate copolymer; and
   (b) 31 to 180 parts by weight of the filler composed of the scaly powder and the granular powder, the fibrous material or the mixture thereof,
   the amount of said scaly powder being 30 to 150 parts by weight based on 100 parts by weight of said binder, the amount of said granular powder, said fibrous material or the mixture thereof being not less than 1 part by weight and less than 50 parts by weight, and the total amount of said scaly powder, said granular powder and said fibrous material being 31 to 180 parts by weight based on 100 parts by weight of said binder.

9. A damping material according to claim 7, wherein said granular powder has an average particle diameter of 0.05 to 100 82 m, and said fibrous material is fibrous, acicular or spindle-shaped material having an average major axial diameter of 0.1 to 50,000 μm, an average minor axial diameter of 0.02 to 250 μm, and an aspect ratio of not less than 3.0.

10. A damping material according to claim 9, wherein said granular powder is at least one selected from the group consisting of hematite particles, magnetite particles, maghemite particles, strontium ferrite particles, barium ferrite particles, quarts sand, talc, clay, lead powder, iron powder, titanium oxide, zinc white, barium sulfate and calcium carbonate.

11. A damping material according to claim 9, wherein said fibrous material is at least one selected from the group consisting of magnetite, maghemite, a synthetic fiber, asbesto, a natural organic fiber, a glass fibers and a carbon fiber.

12. A damping material according to claim 8, wherein the content of said vinyl acetate is 32 to 65 wt %, the amount of said petroleum resin is 160 to 300 parts by weight based on 100 parts by weight of said ethylene-vinyl acetate copolymer, the amount of said scaly powder is 50 to 150 parts by weight based on 100 parts by weight of said binder, the amount of said granular powder, said fibrous material or a mixture thereof is 1 to 40 parts by weight based on 100 parts by weight of said binder, and the total amount of said scaly powder, said granular powder, said fibrous material or a mixture thereof is 70 to 150 parts by weight based on 100 parts by weight of said binder.

* * * * *

UNITED STATES PATENT AND TRADEMARK OFFICE
CERTIFICATE OF CORRECTION

PATENT NO. : 5,350,793
DATED : September 27, 1994
INVENTOR(S) : KISHIMOTO et al

It is certified that error appears in the above-identified patent and that said letters patent is hereby corrected as shown below:

Column 14:
Claim 9, line 47, delete "100 82m" and insert --100 µm--.

Signed and Sealed this

Thirteenth Day of December, 1994

Attest:

BRUCE LEHMAN

*Attesting Officer*   *Commissioner of Patents and Trademarks*